March 7, 1939.  C. McG. SYKES ET AL  2,149,475
PRINTING AND RECORDING MECHANISM FOR WEIGHING APPARATUS
Filed Dec. 4, 1935  4 Sheets-Sheet 1

Inventors: Cameron McGregor Sykes
Arthur Binns
Per: Geo. E. Folkes, Attorney

March 7, 1939. C. McG. SYKES ET AL 2,149,475
PRINTING AND RECORDING MECHANISM FOR WEIGHING APPARATUS
Filed Dec. 4, 1935 4 Sheets-Sheet 2

Inventors:- Cameron McGregor Sykes
Arthur Binns
Per:- George E. Tew Attorney.

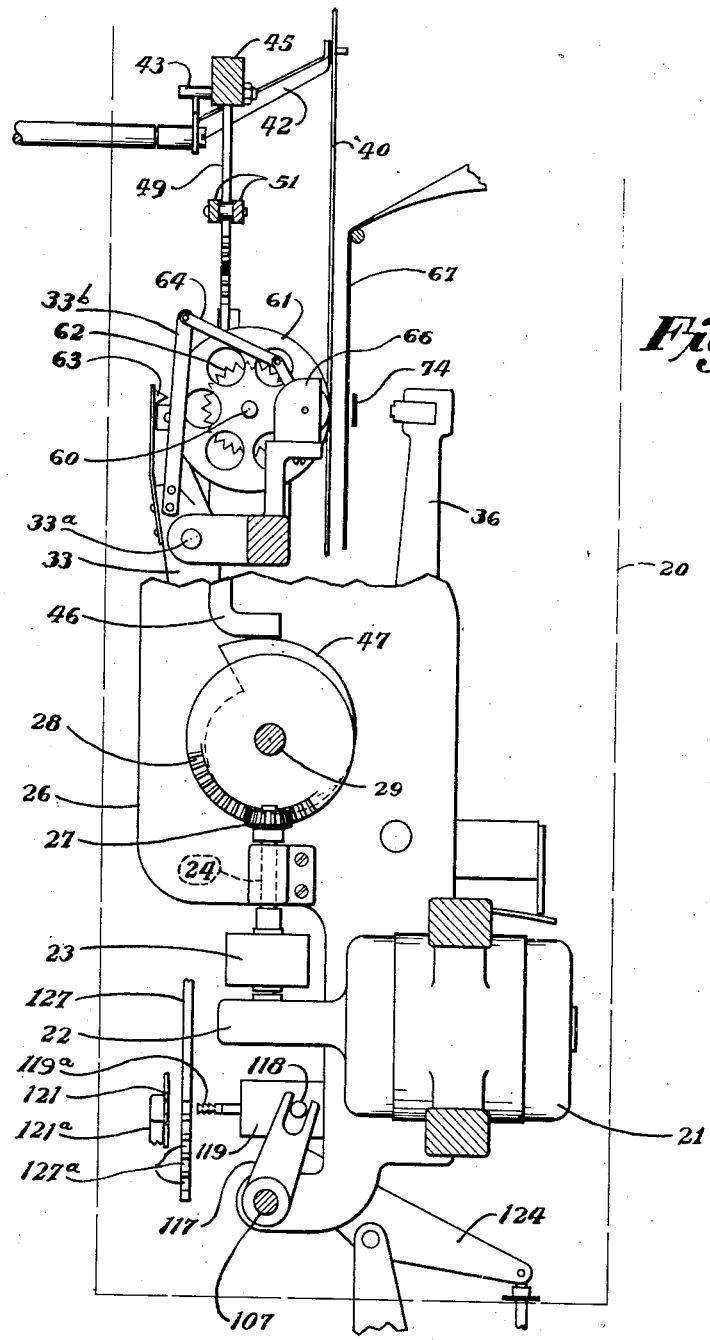

March 7, 1939. C. McG. SYKES ET AL 2,149,475
PRINTING AND RECORDING MECHANISM FOR WEIGHING APPARATUS
Filed Dec. 4, 1935 4 Sheets-Sheet 4
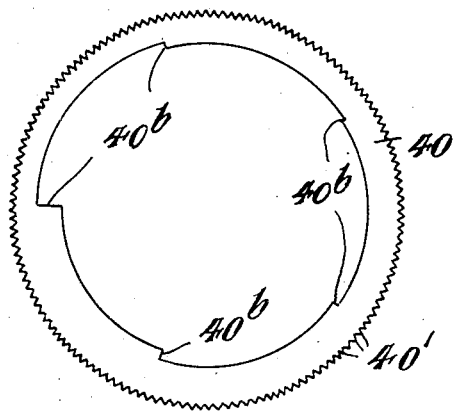
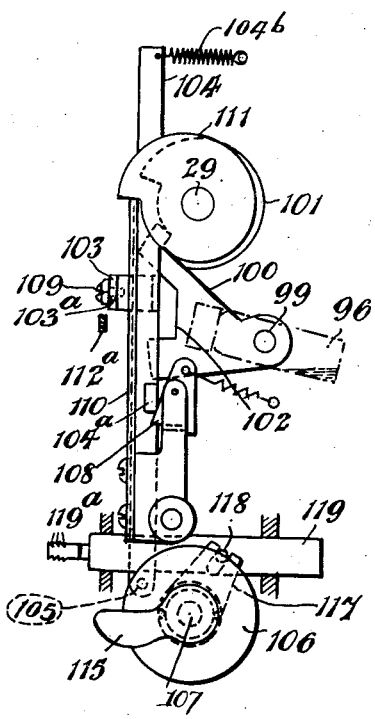
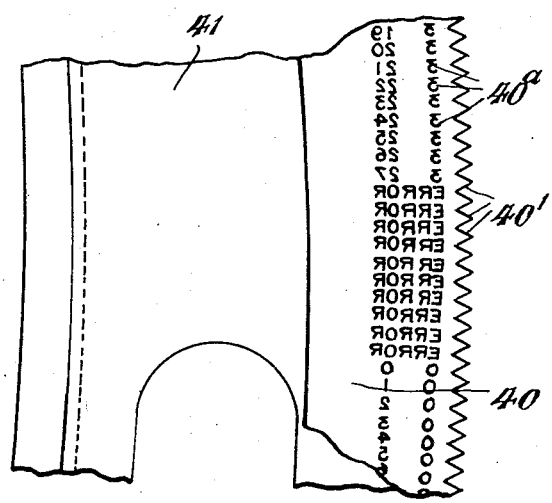
Inventors:- Cameron McGregor Sykes.
Arthur Binns.
Per:- Geo. E. Folkes.
Attorney.

Patented Mar. 7, 1939

2,149,475

UNITED STATES PATENT OFFICE 2,149,475

PRINTING AND RECORDING MECHANISM FOR WEIGHING APPARATUS

Cameron McGregor Sykes and Arthur Binns, Soho Foundry, Birmingham, England, assignors to W. & T. Avery Limited, Birmingham, England Application December 4, 1935, Serial No. 52,842
In Great Britain December 12, 1934

10 Claims. (Cl. 234—5.4)

This invention has reference to improvements relating to printing and recording mechanism for weighing apparatus, and is concerned more particularly with printing and recording mechanism for use with weighing apparatus of the kind having a rotary dial weight indicating mechanism.

The present invention has for its object the provision of an improved printing and recording mechanism which is readily applicable to existing weighing apparatus of the aforesaid kind and which, furthermore, enables a complete record of the weight to be obtained when a range of major weight units is required.

A convenient embodiment of the invention will now be described with particular reference to the accompanying sheets of drawings, which illustrate the invention in its application to a weighing machine of known kind employing a pendulous resistant automatic weight indicating mechanism, such as is disclosed in the United States patent specification No. 1,672,143, and a plurality of additional weights for varying the capacity of the scale, the said additional weights being added to or removed from the intermediate lever system connecting the automatic weight indicating mechanism to the platform lever system in a manner such as is disclosed in the British patent specification No. 320,246.

In the drawings:

Figure 3 is a vertical section taken on the line 3—3 of Figure 1.

Figure 4 is a front elevation to a reduced scale of the type bearing annulus utilized with the unit illustrated in Figures 1 and 2, showing also the steps which are employed when major weights units have to be printed and recorded.

Figure 5 is a fragmentary view to an enlarged scale of a portion of the type bearing annulus and the complementary rotatable dial indicator as seen in Figure 1.

Figure 6 is a diagrammatic representation of part of the mechanism embodied in the unit which will be hereinafter described.

Figure 1:
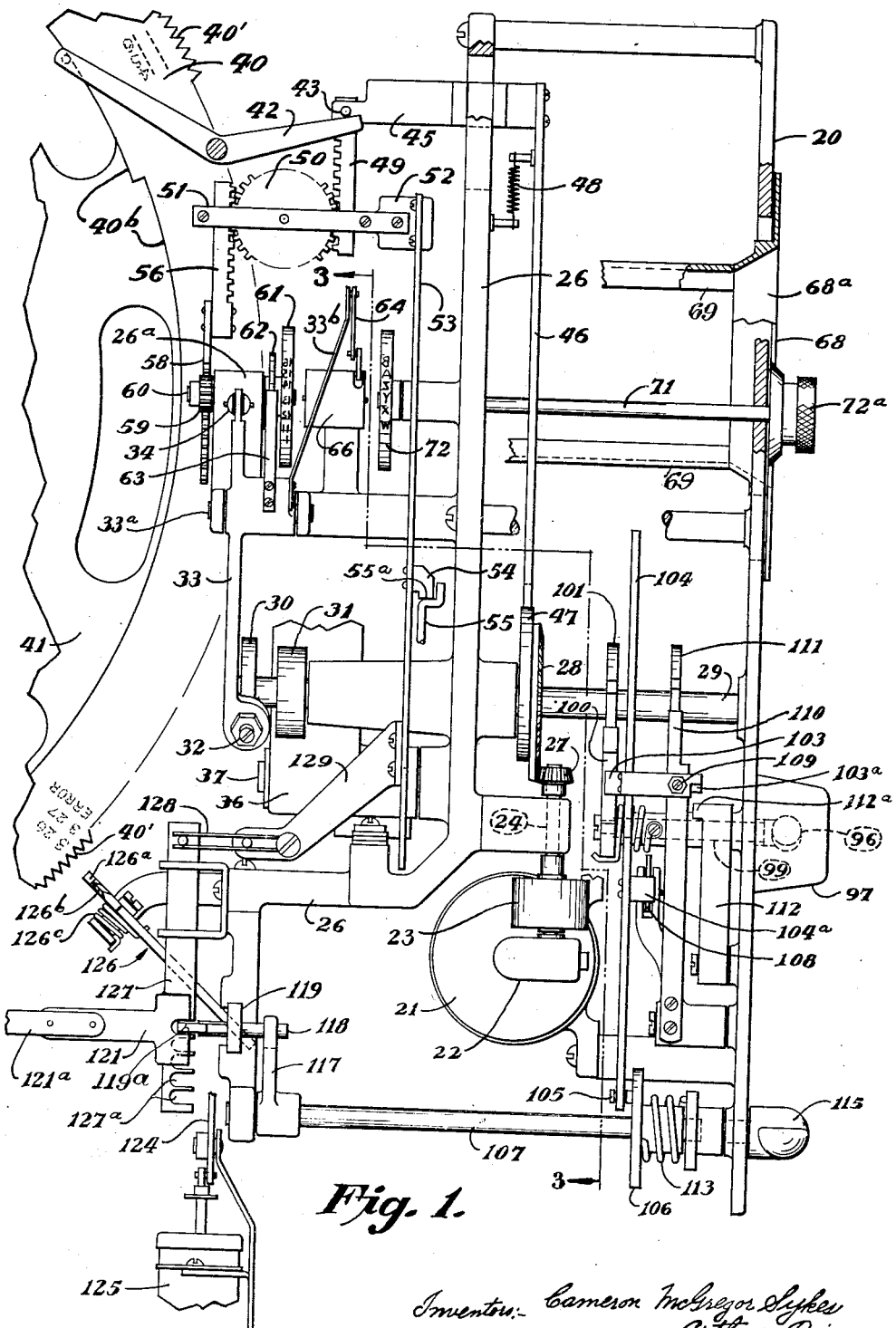
Figure 1 is a side elevation of a unit embodying the invention suitable for use with a weighing apparatus having a rotary dial, some of the structure that is shown being partly broken away for the sake of clearance.
Figure 2:
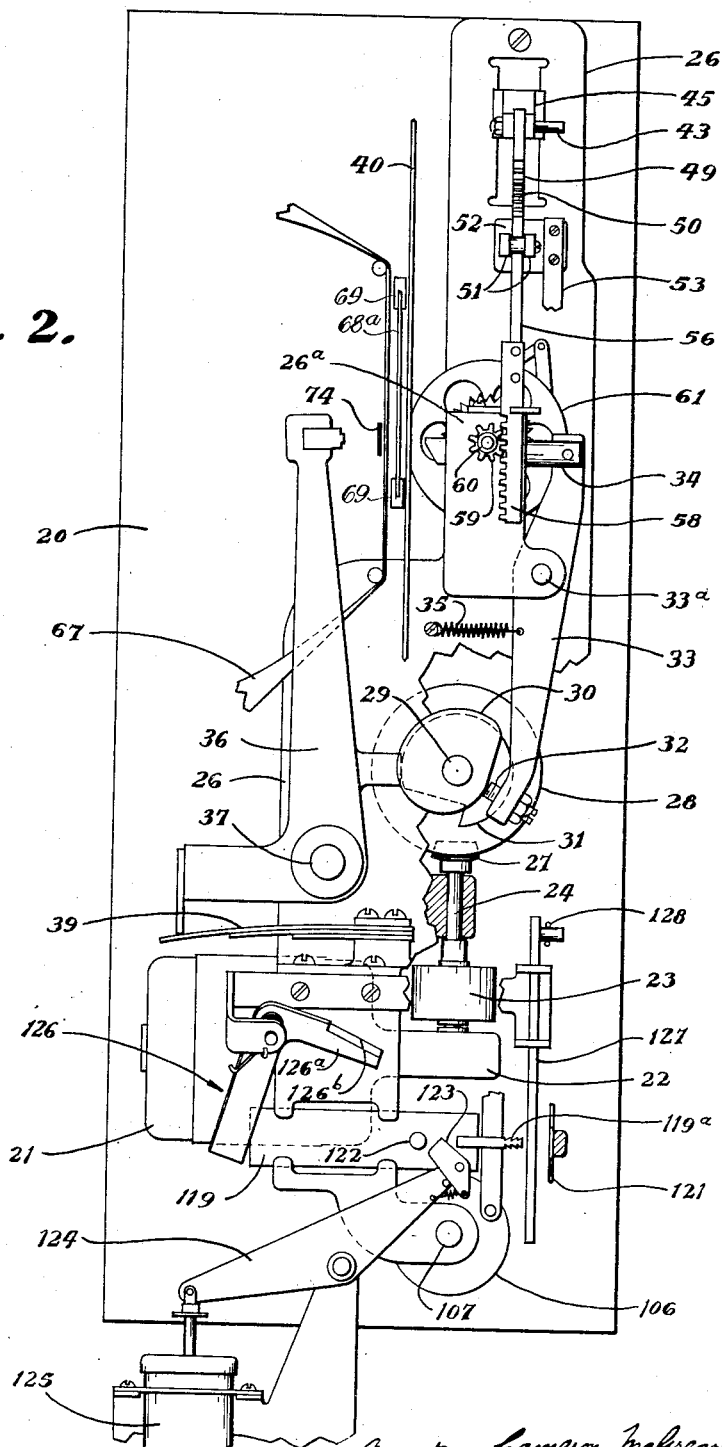
Figure 2 is a rear elevation.

According to the embodiment of the invention illustrated the printing mechanism is carried by a plate 20 which is connected to one side of the usual cylindrical casing (not shown) within which the automatic weight indicating mechanism is contained. (See Fig. 1.) Supported from this plate 20 is an electric motor 21 having a horizontally disposed rotor which is intergeared through a reduction gear box 22 and a friction clutch 23 to the lower end of a vertically disposed spindle 24. This spindle 24 is rotatably mounted in bearings carried by a bracket supported from a mounting plate 26 which is secured to but spaced from the plate 20. At its upper end this spindle 24 carries a bevel pinion 27 which meshes with the teeth of a bevel pinion 28 which is fixed on the intermediate portion of a horizontally disposed shaft 29 which is rotatably mounted in bearings carried by the said mounting plate 26 and by the plate 20, the said shaft 29 being referred to hereinafter as the cam shaft. Mounted on the rearmost portion of the cam shaft 29 are two cams 30 and 31, one of which, namely 30, cooperates with an adjustably mounted inwardly projecting pin 32 carried at the lower end of a lever 33 (see Fig. 2). This lever 33 is fulcrumed on a pin 33ª supported in bearings carried by the mounting plate 26 and at its upper end has a pivotal connection to a plunger 34 slidably mounted in a cylinder formed in a block 26ª supported from the mounting plate 26, the other end of the said plunger 34 constituting the hammer for effecting a printing operation. The lower arm of the hammer lever 33 is connected to a spring 35, the other end of which is anchored to the mounting plate 26, said spring 35 tending to maintain the hammer lever 33 in the out of action position. The other of the aforesaid cams 30 and 31, namely 31, is also located on the cam shaft 29 and bears against an intermediate portion of the lever 36 pivotally mounted at its lower end on a spindle 37 supported from the mounting plate 26. The inwardly presented face of the upper end of the said lever 36 serves as a platten for cooperation with the adjacent end of the plunger 34. The lever 36, hereinafter called the platten lever 36, has a sliding association with a blade spring 39 which normally tends to move the platten lever 36 into printing position.

Adapted to rotate in the space between the acting end of the plunger 34 and the platten face of the platten lever 36, is an annulus 40 (see Figs. 4 and 5) which is secured concentrically to a rotatable dial indicator 41 which is adapted for rotation by the automatic weighing mechanism disclosed in the United States patent specification No. 1,672,143, said annulus 40 having peripheral teeth 40' and bearing on the face thereof adjacent to the platten face of the platten lever 36 lines of type 40ª which are produced by an etching process. The aforesaid annulus 40 is also provided with a plurality of steps 40ᵇ conforming to the major weight units and these steps 40ᵇ cooperate in a well known manner with one arm of a feeler lever 42 (see Fig. 1), the other end of which bears on a pin 43 carried by a block 45 slidably mounted in vertically disposed guides formed in the mounting plate 26. Fixed to the foremost end of the said block 45 is the upper end of a vertically disposed rod 46 the lower end of which is crooked and cooperates with a cam 47 fixed on the cam shaft 29, a spring 48 being provided which tends to maintain the crooked lower end of the said rod 46 in contact with the aforesaid cam 47. At its rearmost end the aforementioned block 45 has pivotally connected thereto a depending rack 49 the teeth whereof mesh with the teeth of a pinion 50 which is rotatably mounted between a pair of bars 51 secured at one end to a slide 52. This slide 52 is carried by a vertically movable strip 53, which in turn is provided with a plate 54 which rests on a shoulder 55ᵃ formed on a rod 55 which is connected to the handle not shown for controlling the addition or removal of the additional weights, see for example British patent specification No. 320,246. The last mentioned pinion 50 also meshes with the teeth of a vertically disposed rack 56 which is oppositely disposed to the rack 49 first mentioned, the second mentioned rack 56 being fixed to another depending rack 58 the teeth whereof mesh with the teeth of a pinion 59 fixed on a spindle 60 carrying a type wheel 61 bearing major weight units, the said type wheel 61 being arranged so that the type in the printing position is aligned with, and in juxta-position to that line of type on the type bearing annulus 40 which is in the printing position. The type wheel 61 has fixed thereto a ratchet wheel 62 (see Fig. 3) which cooperates with a spring mounted ratchet 63 which serves as a locating means for the type wheel 61. Beyond the zero the type bearing annulus 40 (see Fig. 5) is provided with a series of lines of type bearing the word "Error" as and for a purpose to be described hereinafter.

The hammer lever 33 is provided with an upstanding arm 33ᵇ (see Fig. 3) which through a linkage 64 effects the operation of a printing totalizer 66 of known kind (see Figure 3).

The printed record is preferably effected simultaneously on a ticket not shown and on a paper ribbon 67 located within the casing and actuated by a step-by-step motion which need not be described as it is not material to this invention. The ticket is inserted through a slot 68ᵃ (see Fig. 1) formed in a vertically slidable member 68 mounted in the plate 20 and provided with guides 69 for guiding the ticket into printing position.

The plate 20 and the mounting plate 26 are provided with bearings for a rotatable spindle 71 which carries a type wheel 72 bearing code letters which is disposed in juxta-position to the printing totalizer 66 and type wheel 61, said spindle being provided with an externally disposed knob 72ᵃ and indicator whereby any code letter may be printed on the ticket in association with the weight record.

The control of the circuit through the electric motor 21 is effected by a tiltable mercury switch 96 which is mounted in a casing 97 which is disposed on the outside of the plate 20. This mercury switch 96 is fixed to one end of a spindle 99 which is rotatably mounted in bearings carried by the plate 20 and which has on its inner end a quadrant 100 (see Fig. 6), which cooperates with a cam 101 mounted on the cam shaft 29, said cam 101 being gapped as and for a purpose to be referred to hereinafter. The said quadrant 100 is provided with a forked section 102, and the limbs of the forked section cooperate with a striker 103 carried intermediate the ends of a rod 104, which at its lower end is pivotally mounted on a pin 105 which projects from a disc 106 which is fixed on a rockably mounted shaft 107. The striker rod 104 carries a block 104ᵃ which cooperates with a rockable trigger lever 108, mounted on an upstanding trip lever 110, and is normally maintained in locking engagement with the underside of said trigger lever 108 by a spring 104ᵇ connected to the rod 104. The striker 103 carries an adjustable screw 109 which impinges on the upstanding trip lever 110, and the upper end of the said trip lever 110 cooperates with a cam 111 which is also mounted on the forward portion of the cam shaft 29. The said striker 103 is provided with a knife-edge projection 103ᵃ which acts in conjunction with a projection 112ᵃ carried by a pivotal guide plate 112 for a purpose to be described hereinafter.

The rearmost end of the rock shaft 107 carries an upstanding forked member 117 between the jaws of which is carried a pin 118 carried by a plunger 119 slidably mounted in horizontally disposed guides formed in a bracket bolted to the mounting plate 26. At its forward end this plunger 119 is provided with oppositely disposed teeth 119ᵃ (see Figs. 2 and 6) and the said toothed end of the plunger 119 cooperates with a gate formed at the center of a plate 121 carried at one end of a lever 121ᵃ (see Fig. 1) the other end of which is pivotally connected to the piston of a dashpot (not shown), the cooperating cylinder being carried by the automatic weighing mechanism, said plunger, lever, and dashpot cooperating to prevent the printing lever being operated until the automatic weighing mechanism is in equilibrium substantially as described in the prior United States patent specification No. 1,869,289. A pin 122 (see Fig. 2) on the plunger 119 also cooperates with a spring trigger 123 pivotally mounted at the end of the shorter arm of a lever 124 the longer arm whereof is connected to the piston of a dashpot 125 termed the delay action dashpot. This delay action dashpot 125 has a piston provided with a one-way valve to give an unretarded movement on resetting. The end of the plunger 119 opposite to that carrying the teeth normally bears against one arm of a bell crank lever 126 the other arm 126ᵃ whereof carries a knife-edge 126ᵇ which cooperates with the teeth 40¹ (see Fig. 1) of the type bearing annulus 40. Spring means 126ᶜ is provided for causing the knife-edge arm 126ᵃ of the bell crank lever 126 to move into engagement with the teeth of the type bearing annulus 40 when the plunger is moved away from the arm of the bell crank lever 126 which is normally in contact therewith.

The plunger 119 also cooperates with a plurality of slots 172ᵃ formed on a strip 127 which is connected by a spring 128 with an arm 129 fixed to the slidable strip 53 previously referred to, the number of slots 127ᵃ corresponding to the number of settings of the handle governing the removal and addition of the capacity weights, see British patent specification No. 320,246.

The operation of the mechanism is as follows:

When it is desired to obtain a printed record the ticket is inserted through the ticket slot 68ª (see Fig. 1) and passed to the printing position; the code knob 72ª is then adjusted to bring the prescribed code letter on the code type wheel 72 into the printing position. The operating lever 115 is then depressed, and assuming the weighing mechanism is in equilibrium, the depression of the said lever 115, through the coupling spring 113 turns the rock shaft 107 in an anticlockwise direction as viewed from the front of the plate 20. This movement of the rock shaft 107 draws the striker rod 104 downwardly, whereby the striker 103 bears on the lower limb of the forked section 102 of the quadrant 100 (see Fig. 6) and turns the quadrant 100 in an anticlockwise direction, the turning movement of the quadrant 100 continuing until the striker rod projection 104ª engages beneath the trigger lever 108 carried by the trip lever 110. The turning of the quadrant 100 results in a tilting of the mercury switch 96 whereby the circuit through the electric motor 21 is completed. The movement of the rock shaft 107 also effects a displacement of the plunger 119, the toothed end whereof is allowed to pass through the gate carried by the plate 121 (see Fig. 1), assuming the weighing apparatus is in equilibrium. This movement of the plunger 119 results in the knife-edged arm 126ª of the bell crank lever 126 moving into locking engagement with the adjacent tooth of the type bearing annulus 40, thus holding the dial 41 and type bearing annulus 40 in fixed position. The movement of the plunger 119 is controlled by the cooperation of the pin 122 on the said plunger 119 with the dashpot controlled lever 124 (see Fig. 2) carrying the spring controlled trigger 123 associated therewith, the said dashpot 125 ensuring a delayed action of the plunger 119 which prevents a printing operation being initiated by a too quick manipulation of the operating lever 115. It is evident from Fig. 2 that the dashpot lever 124 retards only the initial portion of the movement of the plunger 119; the remaining portion of the movement of the plunger 119 is unretarded and abrupt so as to provide for a quick making action for the mercury switch 96.

The starting of the electric motor 21, by reason of the completion of the circuit as aforesaid, results in a rotation of the cam shaft 29 whereby the cam 101 (see Fig. 6) bears on the upper end of the quadrant 100 and maintains the switch 96 in the circuit making position. The rotation of the cam shaft 29, by reason of the cooperation between the cams 30, 31 (see Fig. 2) on the rearmost end thereof, results in the acting end of the plunger 34 and the platen face of the platen lever 36 being moved together to press the inking tape 74, ticket and paper ribbon 67 against the type on the type bearing annulus 40. The movement of the hammer lever 33 also effects a movement of the totalizer type.

With the capacity changing weights out of action the zero graduation of the major weights unit type wheel 61 is in the printing position.

As additional capacity weights are brought into use, the mechanism for depositing the said weights moves the slide 52 (see Fig. 1) associated therewith upwardly, thereby carrying with it the pinion 50 mounted between the bars 51 carried by the said slide 52. The upward movement of the pinion 50 results in a lifting of the racks 56 and 58 associated therewith, whereby the major units type wheel 61 is rotated to an extent to bring into use the minimum major weights unit corresponding to the increased capacity of the machine. During the initial stages the rotation of the cam shaft 29 moves the deepest part of the cam 47 out of contact with the crooked end of the rod 46, whereby this rod 46 is drawn downwardly by its cooperating spring 48. The downward movement of the rod 46 brings the pin 43 carried by the block 45 to which the said rod 46 is attached, into contact with the adjacent arm of the feeler lever 42 and as soon as the other arm of the feeler lever contacts with the respective stepped portion 40ᵇ of the annulus 40 further downward movement of the block 45 is prevented. The downward movement of the block 45, through the rack 49 carried thereby rotates the pinion 50 and consequently again moves the racks 56 and 58 controlling the setting of the major weight unit type wheel 61, so that the said type wheel is accurately set both according to the capacity weights in use and the setting of the indicator due to the load.

After the printing operation is completed, the continued rotation of the cam shaft 29 causes the cam 111 (see Fig. 6) associated with the trip lever 110 to actuate the said lever 110 to engage the adjusting screw 109 to release the striker 103 from engagement with the forked section 102 of the quadrant 100, and immediately subsequent to bring the gapped portion of the cam 101 into register with the upper limb of the forked section of the quadrant 100 whereby the quadrant 100 is allowed to turn in a clockwise direction by the action of its spring, to tilt the switch 96 to the circuit breaking position. The inertia of the motor 21, subsequent to the breaking of the circuit, results in a further rotation of the cam shaft 29 which causes the trip lever 110 to move the striker rod 104 still farther outward. The striker rod 104 pivots about the pin 105 as an axis. Since the pin 105 is considerably below the axis about which the trip lever 110 pivots, the outward movement of the striker rod 104, under the influence of the trip lever 110, causes the block 104ª of the striker rod 104 to be released from its trigger 108 so as to allow the said rod 104 to return to its normal position. On the return to the normal position the knife-edge extension 103ª of the striker 103 moves on the outside of the projection 112ª on the pivotal guide 112 associated therewith thereby preventing its re-engagement with the quadrant 100 until the plunger 119 has been withdrawn from its engagement with the gate in the associated plate 121 (see Fig. 1).

The rotation of the cam shaft 29 effects a reciprocation of the spindle carrying the feed means for the paper ribbon 67 (see Fig. 3) and the complementary inking tape 74 in well known manner forming no part of this invention.

If the operating lever 115 be snapped the spring coupling 113 (see Fig. 1) takes the shock without imparting movement to the rock shaft 107.

Similarly, if an attempt be made to print before the weighing apparatus and associated plate 121 have come to rest, the serrated end of the plunger 119 is unable to be passed through the gate in the plate 121 associated therewith, and consequently, the striker rod 104 cannot be caused to move the quadrant 100 so as to bring the mercury switch 96 into the circuit making position.

Moreover, unless the handle for controlling the capacity weights according to the British patent specification No. 320,246 is in one of its correct positions, no one of the slots 127a in the strip 127 will be in register with the path of the toothed end of the plunger 119 and consequently the aforesaid handle must be correctly positioned before a record can be made.

If an attempt is made to print with the controlling handle for the capacity weights incorrectly set the strain is taken by the coupling spring 128.

In the event of the misuse of the additional capacity weights, the portion of the type bearing annulus 40 bearing the word "Error" comes into the printing position so that a printed weight record cannot be obtained except when the apparatus is functioning correctly.

We claim:

1. A printing mechanism for use with weighing apparatus embodying a type bearing member which forms part of the weighing apparatus and which is displaceable proportionately to the load, an impression means for taking a record from said type, an electric motor for providing the motive force for said impression means, a locking means for the type bearing member, controlling means for the electric motor which co-acts with the aforesaid locking means, and means influenced by the weighing mechanism which prevents both the movement of the locking means to the locking position and the actuation of the aforesaid controlling means to bring the electric motor into operation, except when the weighing apparatus is in equilibrium.

2. A printing mechanism for use with weighing apparatus embodying a type bearing member which forms part of the weighing apparatus, which is displaceable proportionately to the load and which provides for the minor range of weighment, a separate type bearing means for the major order of weighment arranged in juxtaposition to the type for the minor range of weighment, means controlled by the aforesaid type bearing member for determining the setting of the major weight units type, an impression means for taking a record from said types, an electric motor for providing the motive force for the impression means and for effecting the setting of the major weights units type under the control as aforesaid, a locking means for the displaceable type bearing member, controlling means for the electric motor which co-acts with the aforesaid locking means, and means influenced by the weighing mechanism which prevents the locking means being moved to the locking position and the actuation of the controlling means to bring the motor into operation, except when the weighing apparatus is in equilibrium.

3. A printing mechanism for use with weighing apparatus according to claim 1, having a manually operable member and a spring means connecting said manually operable member and the means for actuating the aforesaid locking and motor controlling means, said spring means transmitting a force applied to the manually operable member to effect the actuation of the locking means and of the motor controlling means to cause a printing operation to be effected when the weighing apparatus is in equilibrium but preventing the transmission of shock to the mechanism in the event of an endeavour being made to obtain a printed record when the weighing apparatus is not in equilibrium.

4. A printing mechanism for use with weighing apparatus embodying in combination a type bearing member which forms part of the weighing apparatus and which is displaceable with the load, an impression means for taking a record from said type, an electric motor, a cam shaft adapted to be driven by said electric motor, cams on said shaft for effecting the operation of said impression means when the shaft is rotated by the said electric motor, a switch controlling the operation of said motor, a locking means for the type bearing member, means for actuating said locking means, a manually operable member, spring means connecting the aforesaid actuating means and the manually operable member for preventing the transmission of shock to the mechanism in the event of an endeavour being made to effect a printing operation when the weighing apparatus is not in a condition of equilibrium and a sequence controlling means co-acting with the locking and switch actuating means for ensuring that once the said actuating means has been operated correctly a prescribed sequence of operations is followed before the manually operable control member can again be effectively manipulated.

5. A printing mechanism for use with weighing apparatus embodying an annular type bearing member which forms part of the weighing apparatus and which is displaceable with the load and adapted to give an indication of the lower ranges of weighment, a separate type bearing means for the major weights units arranged in aligned juxtaposition with the annular type bearing member, a lever disposed on one side of the annular bearing member, a platten carried by said lever, a lever disposed on the opposite side of the annular type bearing member, a hammer carried by the last-mentioned lever, an electric motor, a cam shaft adapted to be driven by said motor, cams carried by the cam shaft for moving the platten and hammer together for causing an impression to be taken from the type when the cam shaft is rotated by the motor, steps on the annular member correlated with the major weights units, a feeler for co-operation with said steps, a slidable member associated with the aforesaid feeler, a cam on the cam shaft, means controlled by the last-mentioned cam for moving the slidable member so that this member in conjunction with the feeler and steps on the annular type bearing member sets the type for the major weights units, a switch controlling the operation of the electric motor, a locking means for the type bearing member for the minor weight range and means influenced by the weighing mechanism which prevents the switch being operated to bring the motor into operation and the locking means to be moved into the locking position except when the weighing apparatus is in equilibrium.

6. In combination with a printing mechanism, according to claim 5, means for preventing a driving relationship obtaining between the motor and the cam shaft except when any apparatus for controlling the addition or removal of capacity weights is correctly set.

7. In combination with a printing mechanism, according to claim 2, means for effecting a changing of the major weight units type in the event of the addition or removal of weights for changing the capacity of the weighing apparatus.

8. A printing mechanism for use with weighing apparatus embodying a movable annular type bearing member which forms part of the weighing apparatus which is displaceable with the load and which is adapted to give an indication of the lower ranges of weighment, a separate type bearing member for the major weights units arranged in aligned juxta-position with the annular type bearing member, means associated with the annular type bearing member for controlling the setting of the major weight units type, means for locating a printable medium adjacent to the types, and an electric motor, means driven by said motor for moving the printable medium into contact with the types, means driven by said motor for effecting the setting of the major weight units type under the control of the means aforesaid, a switch controlling the operation of the electric motor, a locking means for the type bearing member for the minor weighment range, and means influenced by the weighing apparatus for preventing said switch being operated to establish a driving relationship between the motor and the cam shaft and for preventing the locking means being moved to the locking position except when the weighing apparatus is in equilibrium.

9. A printing mechanism for use with weighing apparatus embodying a movable annular type bearing member which forms part of the weighing apparatus which is displaceable with the load and which is adapted to give an indication of the lower ranges of weighment, a separate type bearing member for the major weight units arranged in aligned juxta-position with the type bearing member, means associated with the annular type bearing member for controlling the setting of the major weight units type, means for locating a printable medium adjacent to the type, an electric motor, means driven by said motor for moving the printable medium into contact with the type, means driven by said motor for effecting the setting of the major weight units type under the control of the means aforesaid, a switch controlling the operation of the electric motor, a locking means for the annular type bearing member, interconnected means for actuating said switch and locking means, a plunger device, a member adapted to co-operate with the plunger device and to be influenced by the weighing mechanism whereby the plunger can only be moved when the weighing mechanism is in a condition of equilibrium and interconnecting means between the plunger and the actuating means for the switch and locking means which prevent a driving relationship being established between the motor and the parts driven thereby and the moving of the locking means into the locking position except when the weighing apparatus is in equilibrium.

10. A printing mechanism for use with weighing apparatus embodying a movable annular type bearing member which forms part of the weighing apparatus, which is displaceable with the load and which is adapted to give an indication of the lower ranges of weighment, a separate type bearing means for the major weights units arranged in aligned juxta-position to the aforesaid type bearing members, means associated with the movable annular type bearing member for controlling the setting of the major weight units type, means for locating a printing medium adjacent to the type, an electric motor, means driven by said motor for moving the printable medium into contact with the type, means driven by said motor for effecting the setting of the major weights units type, a switch controlling the operation of the electric motor, a member influenced by the weighing mechanism, a plunger associated with the member influenced by the weighing mechanism whereby the plunger can only be moved when the member influenced by the weighing mechanism is in the equilibrium position, means associated with the plunger for locking the movable annular type bearing member when the apparatus is in the equilibrium position, means for actuating said switch, interconnecting means between the plunger and the actuating means for the switch, locking means which prevent a driving relationship being established between the motor and the parts driven thereby and which prevent the locking means being moved into the locking position except when the weighing apparatus is in equilibrium and means associated with the switch controlling means and with the locking means for ensuring that a prescribed sequence of operations must be carried out once the actuating means has been correctly operated before the actuating means can again be effectively manipulated.

CAMERON McGREGOR SYKES.
ARTHUR BINNS.